United States Patent [19]

Ketcham

[11] Patent Number: 5,486,025

[45] Date of Patent: Jan. 23, 1996

[54] STUFFER PIN ASSEMBLY FOR QUICK CONNECTOR

[75] Inventor: Mark G. Ketcham, East China, Mich.

[73] Assignee: Bundy Corporation, Warren, Mich.

[21] Appl. No.: 314,892

[22] Filed: Sep. 29, 1994

[51] Int. Cl.$^6$ ................................ F16L 39/00
[52] U.S. Cl. ............... 285/319; 285/23; 285/348; 285/351; 285/906; 285/921
[58] Field of Search ................... 285/319, 921, 285/233, 23, 348, 351, 906

[56] References Cited

U.S. PATENT DOCUMENTS

| | | | |
|---|---|---|---|
| 3,540,758 | 11/1970 | Torres | 285/233 |
| 4,733,890 | 3/1988 | Vyse . | |
| 4,750,765 | 6/1988 | Cassidy et al. . | |
| 4,915,136 | 4/1990 | Bartholomew . | |
| 5,161,830 | 11/1992 | Abe . | |
| 5,195,787 | 3/1993 | Bartholomew . | |
| 5,257,833 | 11/1993 | McNaughton et al. | 285/319 |
| 5,275,448 | 1/1994 | McNaughton et al. . | |
| 5,324,081 | 6/1994 | Umezawa | 285/319 X |
| 5,368,275 | 11/1994 | Ketchum et al. | 285/319 X |
| 5,378,025 | 1/1995 | Szabo | 285/319 X |

FOREIGN PATENT DOCUMENTS 992488  5/1965  United Kingdom .............. 285/233

Primary Examiner—Dave W. Arola
Attorney, Agent, or Firm—Dorn, McEachran, Jambor & Keating

[57] ABSTRACT

A stuffer pin assembly for carrying and loading internal components of a female connector body of a quick connector coupling. The assembly includes a cylindrical carrier body extending between a first end and a second end. A radial shoulder spaced from the first end is formed in the body. A cylindrical wall extends between the radial shoulder and the second end. A groove is formed in the cylindrical wall. At least one seal is secured on the carrier body within the groove. A spacer is secured on the carrier body between the groove and the radial shoulder. A retainer is secured on the carrier body and includes an annular ring surrounding the carrier body between the spacer and the radial shoulder. A plurality of legs extend away from the ring and toward the first end of the carrier body. A male member insertable into a loaded connector body includes an annular ferrule secured on a tube around one or more upsets. The ferrule is positioned between the legs and ring of the retainer to secure the male member in the connector body.

12 Claims, 8 Drawing Sheets

STUFFER PIN ASSEMBLY FOR QUICK CONNECTOR

BACKGROUND OF THE INVENTION

This invention relates to fluid line systems which include quick connector couplings, and more particularly to a stuffer pin assembly for loading retention and sealing elements into an empty female connector body.

In automotive and other fields, quick connector couplings, which generally include a male member received and retained in a female connector body, are often utilized to provide a fluid connection between two components or conduits, thus establishing a fluid line between the two components. Use of quick connector couplings is advantageous in that a sealed and secured fluid line may be established with a minimum amount of time and expense.

The female connector body portion of the coupling typically houses internal components, namely, retention and sealing elements, prior to insertion of the male member. Generally, the internal components are loaded into the connector body prior to shipping to a manufacturer which utilizes the quick connector couplings in an assembly.

In some applications, it is desirable to provide the manufacturer with an empty connector body, and a method of loading the internal quick connector components whenever desired. The female connector body may be, for example, a portion of a complex assembly, or a portion of an assembly that is subjected to environments during assembly and testing phases that could damage the quick connector components. In such cases, it may be preferable to delay loading the connector body with components.

SUMMARY OF THE INVENTION

The present invention provides a stuffer pin assembly for transporting, protecting and loading internal components of a quick connector into a female connector body.

The stuffer pin assembly includes a component carrier having a cylindrical body and an enlarged portion formed at a first end of the carrier body. The carrier body extends from the first end to a second end remote from the enlarged portion of the carrier. A frustro-conical nose is formed at the second end of the carrier body. A first cylindrical wall extends from the nose to a groove. A second cylindrical wall extends from the groove to a lowermost extent of a radial shoulder. A third cylindrical wall extends from an uppermost extent of the shoulder to a large diameter end of a frustro-conical wall. A fourth cylindrical wall extends from a small diameter end of the frustro-conical wall to the enlarged portion of the component carrier.

The stuffer pin assembly further includes at least one seal secured on the component carrier within the groove. A hollow spacer is secured on the component carrier between the groove and the radial shoulder and surrounds the second cylindrical wall. A retainer may also be secured on the component carrier. The retainer includes an annular ring surrounding the second cylindrical wall between the spacer and the radial shoulder, and a plurality of legs extending away from the ring toward the first end of the component carrier.

The present invention also provides a novel quick connector coupling formed in a fluid line. The coupling includes a female connector body having a bore extending from an entrance. The bore defines a radial shoulder facing away from the entrance. A retainer is disposed in the connector body bore and includes an annular ring spaced from the radial shoulder. Support members extend from the ring to the shoulder to secure the retainer in the connector body bore, and load bearing members extend from the radial shoulder toward the ring.

A male member is disposed in the bore and includes a ferrule secured around one or more upsets. The ferrule is positioned in the bore between the retainer annular ring and the retainer load bearing members. The load bearing members abut the ferrule to retain the male member in the bore.

DETAILED DESCRIPTION OF THE PREFERRED EMBODIMENTS

Figure 1:
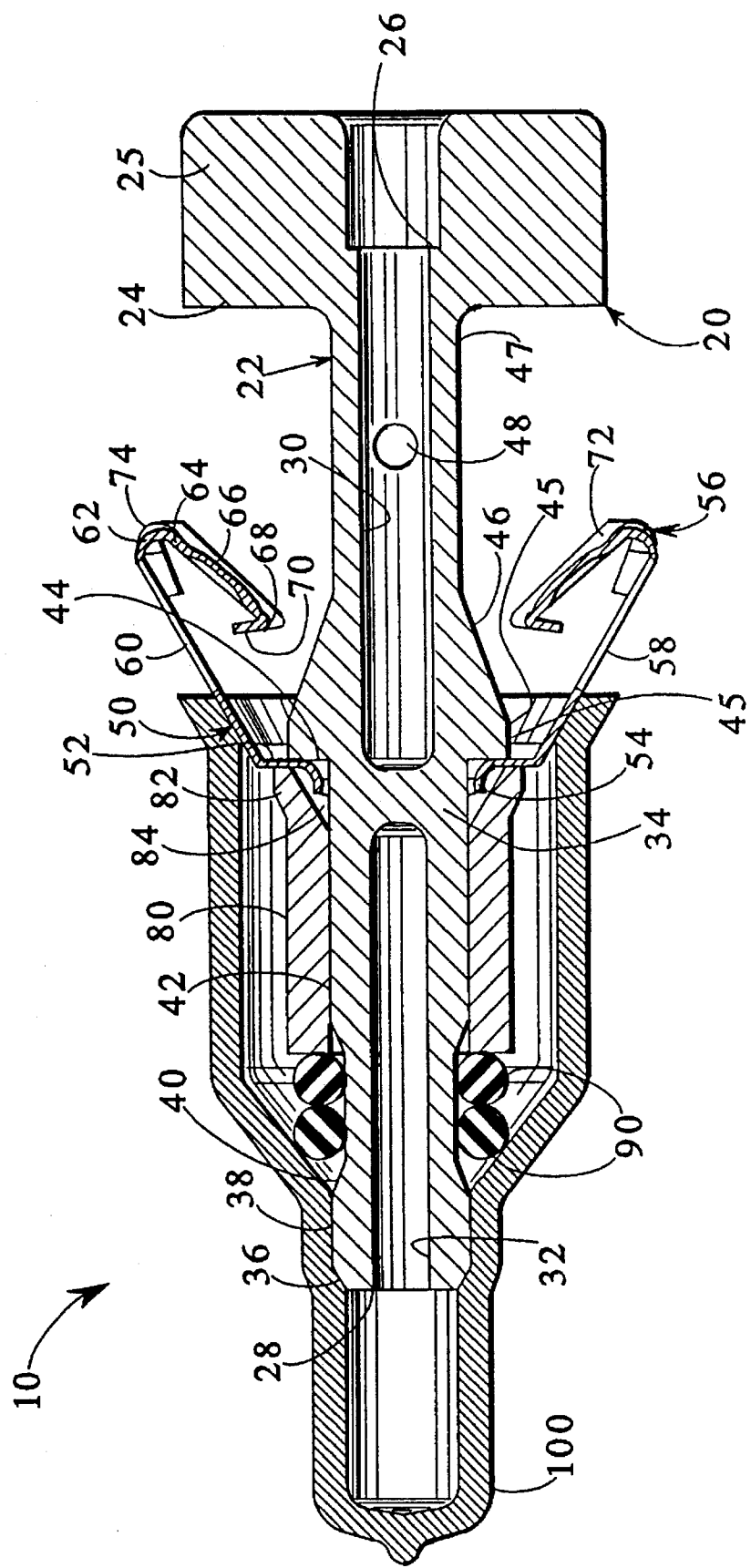
FIG. 1 is a sectional view of a stuffer pin assembly which embodies the present invention.

A stuffer pin assembly embodying the present invention is designated as 10 in FIG. 1. Broadly stated, the purpose of stuffer pin assembly 10 is provision of an efficient mechanism for aligning, transporting, protecting, and loading the internal components of a female connector body portion of a quick connector coupling prior to coupling with a male member.

Figure 6:
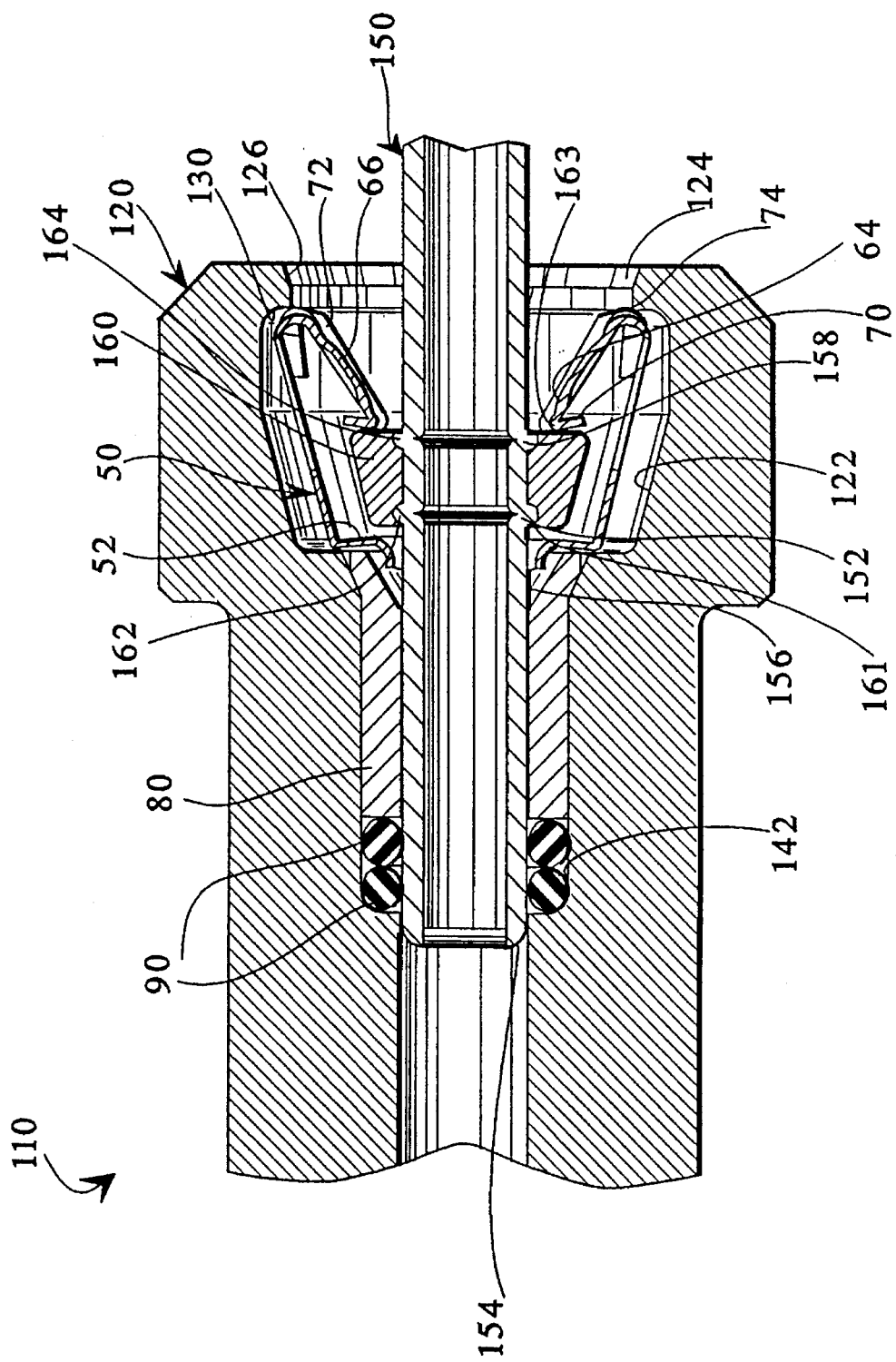
FIG. 6 is a sectional view of a quick connector coupling which embodies the present invention comprising a male member inserted into a female connector body which has been loaded as in FIGS. 2-5.

A quick connector coupling 110, formed through use of assembly 10, is illustrated in FIG. 6. Coupling 110 includes a male member 150 which is sealingly received and secured in a female connector body 120. Male member 150 and female connector body 120 form parts of, and lead to other components in, a fluid line system. One particular fluid line system in which the present invention finds application is an automotive hydraulic brake system. Others are envisioned.

Stuffer pin assembly 10 includes a component carrier 20 supporting a number of components which ultimately are to be housed within female connector body 120. The components supported by carrier 20 include a retention element, represented by retainer 50, and sealing elements, represented by spacer 80 and O-ring seals 90. A protective cover or shipping cap 100 covers the components of stuffer pin assembly 10 prior to their insertion into connector body 120.

The configuration of component carrier 20 is dictated by several considerations. First, the sealing and retention elements must be maintained in a particular axial alignment on carrier 20 prior to their insertion into connector body 120. Second, stuffer pin assembly 10 must be easily insertable into connector body 120 to deliver the sealing and retention components to their proper positions within connector body 120. Third, stuffer pin assembly 10 should protect the quick connector components from external contaminants prior to removal of component carrier 20 from body 120. Finally, carrier 20 should be easily removable from connector body 120, without disruption of the sealing and retention components, to permit insertion of male member 150.

Component carrier 20 may be produced from a variety of materials. Since it will normally be discarded or recycled, however, an inexpensive plastic such as polypropylene is preferred.

Component carrier 20 includes an elongated cylindrical body 22 extending between an open end 26 and an open end 28. An enlarged portion 24, continuous with body 22, surrounds open end 26. Gripping prongs or tabs 25, spaced circumferentially about enlarged portion 24, project away from body 22.

Optional bores 30 and 32 extend axially into body 22 from, respectively, ends 26 and 28. Bores 30 and 32 do not meet to form a continuous bore through body 22. A solid web 34 formed in a central portion of carrier body 22 separates bore 30 from bore 32.

The lack of a continous bore through component carrier 20 is important to prevent establishment of a passageway for entry of contaminants into connector body 120 prior to removal of carrier 20. Bores 30 and 32 could be eliminated (resulting in a completely solid cylindrical body 22) without affecting the performance of assembly 10. However, inclusion of bores 30 and 32 is desirable since it conserves material and reduces weight.

A frustro-conical nose 36 is formed on body 22 adjacent end 28. Nose 36 assists in the centering and guidance of carrier 20 through connector body 120. A first cylindrical wall 38 extends from the large diameter end of nose 36 to a groove, or depression, 40. Groove 40 is preferably wide enough to accomodate two O-ring seals. A second cylindrical wall 42 continuous with groove 40 extends to the bottom of an annular shoulder 44. A third cylindrical wall 45 continous with the top of shoulder 44 extends for a relatively short distance to the large diameter end of a frustro-conical wall 46. A fourth cylindrical wall 47 continuous with the small diameter end of frustro-conical wall 46 extends to the confluence of enlarged portion 24 and cylindrical body 22.

Optionally, a pair of one-hundred eighty degree spaced apertures 48 are formed through cylindrical wall 47. Apertures 48 permit insertion of a removal tool through body 22 to provide leverage for removing component carrier 20 from connector body 120.

Disposed on component carrier 20 in groove 40 are seals that may be in the form of O-rings 90. Two O-rings are shown, and preferred, but one O-ring may be sufficient. In some applications, a back-up ring may be utilized behind the seal. Adjacent O-rings 90 is a hollow, cylindrical spacer 80. Spacer 80 surrounds and is retained on carrier 20 between O-rings 90 and radial shoulder 44. The inner diameter of spacer 80 approximates the outer diameter of cylindrical wall 42 of carrier body 22 throughout the majority of its length, resulting in a close, telescoping fit of spacer 80 about carrier 20. A conical enlargement 82 is formed at an end of spacer 80 remote from O-rings 90. Conical enlargement 82 diverges away from cylindrical wall 42 to define a space 84 between spacer 80 and carrier 20.

A retainer 50, preferably formed of metal, includes an annular ring 52 surrounding and retained on carrier 20. Ring 52 is situated between radial shoulder 44 and spacer end 82. A cylindrical collar 54 extends a short distance from the inner periphery of ring 52 into the space 84 defined between spacer 80 and carrier 20. Collar 54 fits closely around wall 42 of carrier 20 to assist in the centering and securement of retainer 50 on carrier 20.

Figure 8:
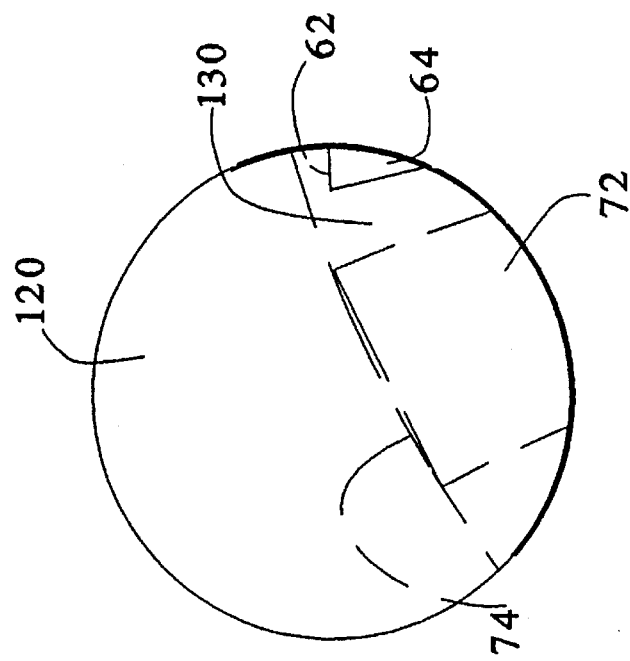
FIG. 8 is an enlargement of a portion of the quick connector coupling of FIG. 7.
Figure 7:
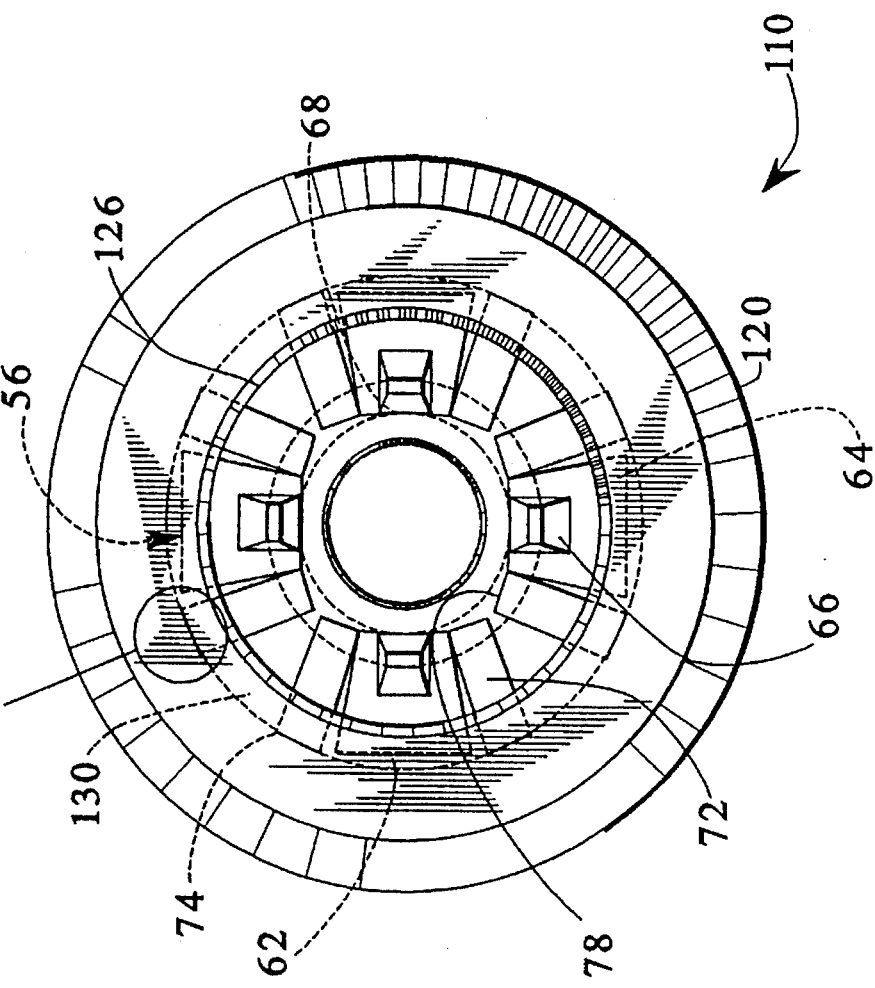
FIG. 7 is a front end view of the quick connector coupling.
Figure 9:
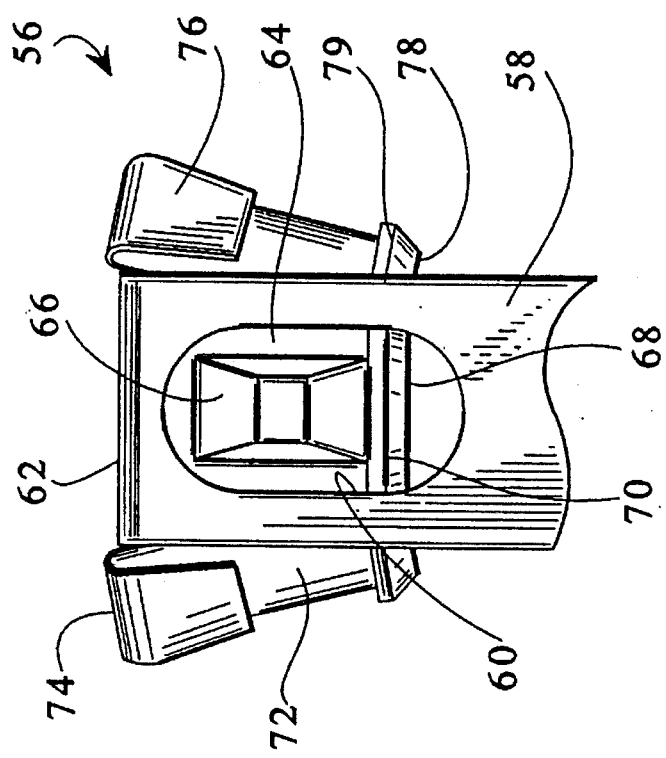
FIG. 9 is an enlarged perspective view of a retainer leg which embodies the present invention.

A plurality of circumferentially spaced legs 56 extend away from retainer ring 52. Four legs are preferred, but more, or less, may be used depending on the retention ability desired. Legs 56 are spaced in ninety degree relation about ring 52. Each leg 56 includes a support member 58, a retaining member 64 and two wings 72. The details of retainer legs 56 are best seen in FIGS. 7–9.

Support members 58 extends away from ring 52 to bends 62. Apertures 60 may be formed in members 58 to assist in insertion into, or removal from, connector body 120 (independent of stuffer pin 20). Legs 56 reverse direction at bends 62. Retaining members 64 continuous with support members 58 extend from bends 62 back toward ring 52 to second leg bends 68. Bends 68 are spaced from ring 52. Retaining members 64 are positioned "underneath" support members 58. Ramped protuberances 66 may be formed on retaining members 64 in order to provide enhanced stiffness to members 64 and enhanced resistance to insertion of a male quick connector member. At second bends 68, legs 56 extend outwardly to define leg flanges 70.

Wings 72 extend circumferentially from the lateral edges of retaining members 64. They extend between an outer wing bend 74, remote from ring 52, and an inner wing bend 78, adjacent leg flanges 70. At outer wing bends 74, wings 72 are bent to define outer flanges 76. At inner wing bends 78, wings 72 are bent to define inner flanges 79.

Wings 72 extend to a position more remote from retainer ring 52 than do retaining members 64. Stated another way, wing bends 74 extend further from ring 52 than do leg bends 62. Thus, in operation, it is wing bends 74 that contact an interior wall of connector body 120 to secure retainer 50 within connector body 120. Leg bends 62 are held out of contact with body 120. Preferably, wing bends 74 extend approximately 0.25 mm beyond leg bends 62.

Protective cover or shipping cap 100 surrounds O-rings 90, spacer 80 and a portion of retainer 50 prior to insertion of assembly 10 into connector body 120. Cap 100 protects the quick connector components from extended contact with dust, moisture and other external contaminants. Cap 100 should be flexible and easily removable. A disposable plastic is preferred.

Assembly of the quick connector components onto component carrier 20 is a relatively simple proposition. Retainer 50 is slipped over carrier end 28 and moved over carrier body 22 until ring 52 abuts shoulder 45. It should be oriented such that retainer legs 56 project away from ring 52 toward carrier end 26. Next, spacer 80 is slipped over carrier end 28 and moved over body 22 until its end 82 abuts retainer ring 52. Then, O-rings 90 are moved over end 28 and positioned in groove 40. Finally, protective cover 100 is slipped over end 28 and over the assembly.

Connector body 120, best seen in FIGS. 2–6, is the female portion of a quick connector coupling. It may may lead to a component in a fluid line system, or it may itself be a portion of a fluid line system component. In any case, prior to insertion of stuffer pin assembly 10, connector body 120 is "empty". That is, no sealing or retention components are present in connector body 120.

Connector body 120 is hollow and defines a bore 122. Bore 122 defines an enlarged retainer housing portion 129 at an end of connector body 120 having an entrance 124 adjacent a chamfer 126 and a radial, annular rim 128. Retainer housing portion 129 includes an inwardly-facing radial shoulder 130, and a first cylindrical wall 132 continous with and extending away from shoulder 130. It further includes a frustro-conical wall 134 continuous with wall 132 at its end of largest diameter, and continous with an outwardly-facing radial shoulder 136 at its end of smallest diameter.

Connector body bore 122 further defines a seal housing portion 138. It includes a frustro-conical spacer seat 140 continuous with outwardly-facing shoulder 136 at its end of largest diameter, and continuous with cylindrical sealing wall 142 at its end of smallest diameter. Sealing wall 142 extends from spacer seat 140 to a radial O-ring seat 144. Fluid passage portion 146 of bore 122 extends away from seal housing portion 138 to other components in the fluid line system.

FIGS. 2–5 illustrate chronologically ordered steps in the use of stuffer pin assembly 10 to install retainer 50, spacer 80 and O-rings 90 in female connector body 120.

Figure 2:
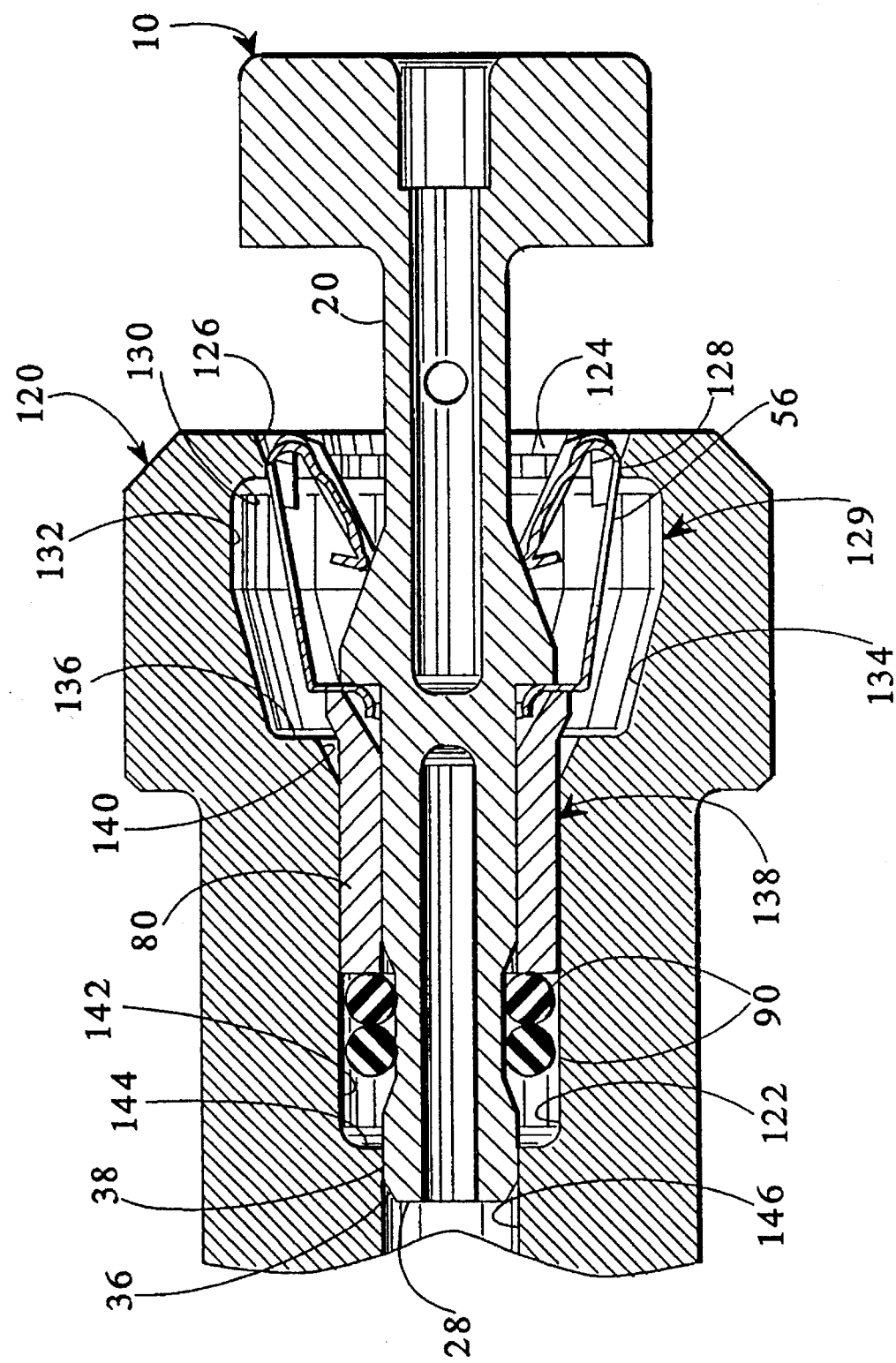
FIG. 2 is a sectional view illustrating partial insertion of the stuffer pin assembly into an empty female connector body.

FIG. 2 illustrates partial insertion of stuffer pin assembly 10 into an empty connector body 120. Protective cover 100 is removed prior to insertion. In a relaxed state, as in FIG. 1, the radially outer dimension of portions of retainer legs 56 exceeds the radial clearance provided by connector body entrance 124. Thus, in order to pass assembly 10 through entrance 124, it is necessary to temporarily flex or deform legs 56 inwardly. As seen in FIG. 2, this necessary inward deformation is effected by the coaction between chamfer 126 and rim 128, and retainer legs 56.

Also notable in FIG. 2 is that spacer 80 and O-rings 90 are sized such that they fit closely within seal housing portion 138 of connector body bore 122. Cylindrical wall 38 formed on component carrier 20 must pass partially into fluid passage portion 146 of bore 122. Accordingly, its outer diameter must not exceed the inner diameter of fluid passage portion 146. Nose 36 assists in the guidance of carrier end 28 into fluid passage portion 146.

Figure 3:
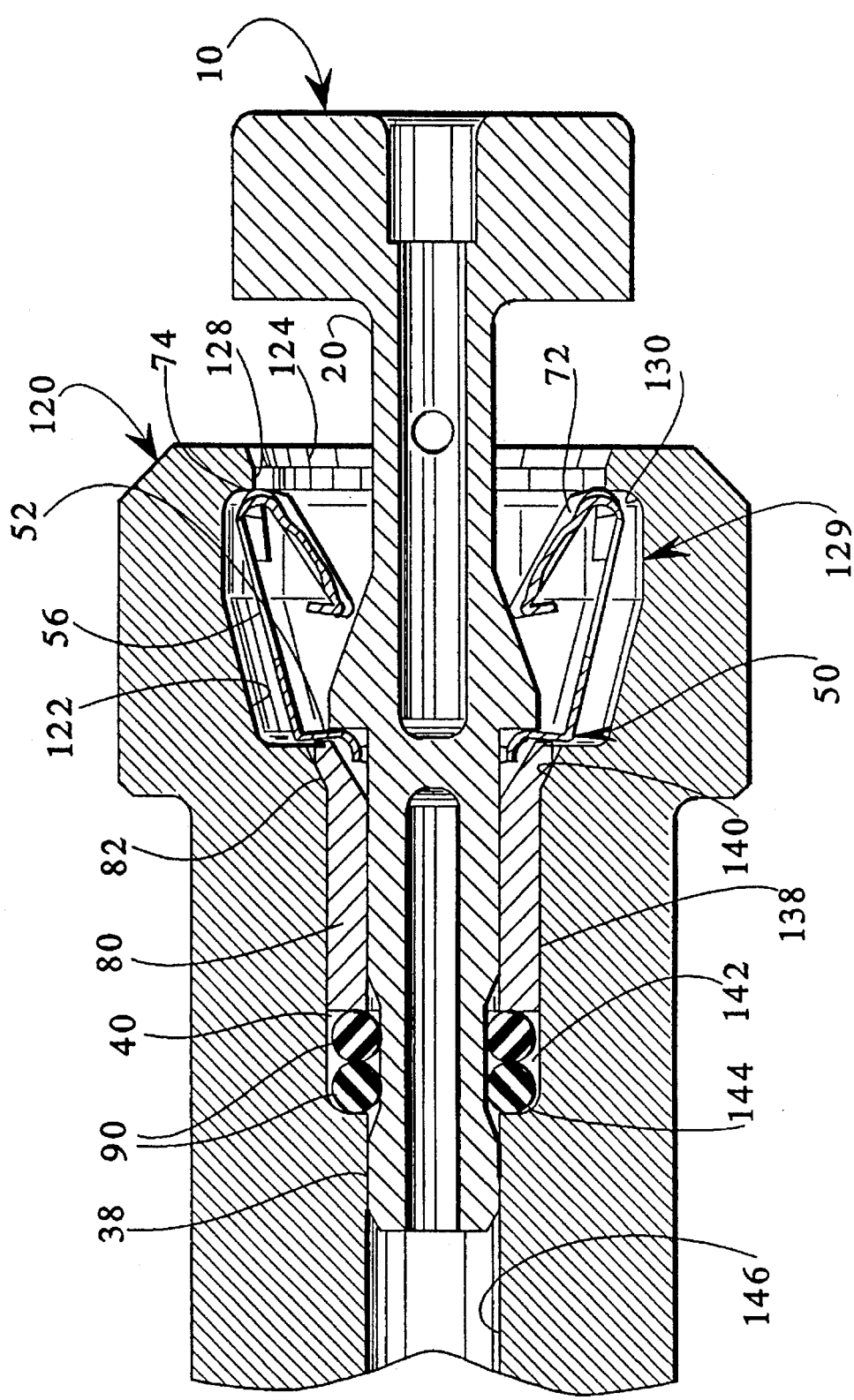
FIG. 3 is a sectional view illustrating complete insertion of the stuffer pin assembly to produce a loaded female connector body.

FIG. 3 shows complete insertion of stuffer pin assembly 10 into connector body 120. In this state, connector body 120 is "loaded". That is, the sealing and retention elements of the coupling have been completely inserted into connector body 120. A loaded connector body is characterized in that withdrawal of component carrier 20 from the connector body does not cause concomitant withdrawal of the sealing and retention elements. Once loaded, the sealing and retention elements are retained within connector body 120.

After retainer legs 56 have moved completely past connector body rim 128 they spring outwardly within retainer housing portion 129 of connector body bore 122. In this position, wing bends 74 abut annular shoulder 130 to secure retainer 50 within connector body bore 122. Conical enlargement 82 of spacer 80 seats against conical spacer seat 140. Contact between spacer 80 and retainer ring 52 secures spacer 80 and O-rings 90 within bore 122. O-ring seals 90 are disposed in seal housing portion 138 of bore 122 between spacer 80 and O-ring seat 144. Cylindrical wall 38 of component carrier 20 has moved fully into fluid passage portion 146 of bore 122.

In this fully inserted state, component carrier 20 acts as a plug for connector body 120. Possibly damaging environmental contaminants are kept away from the sealing components.

Figure 4:
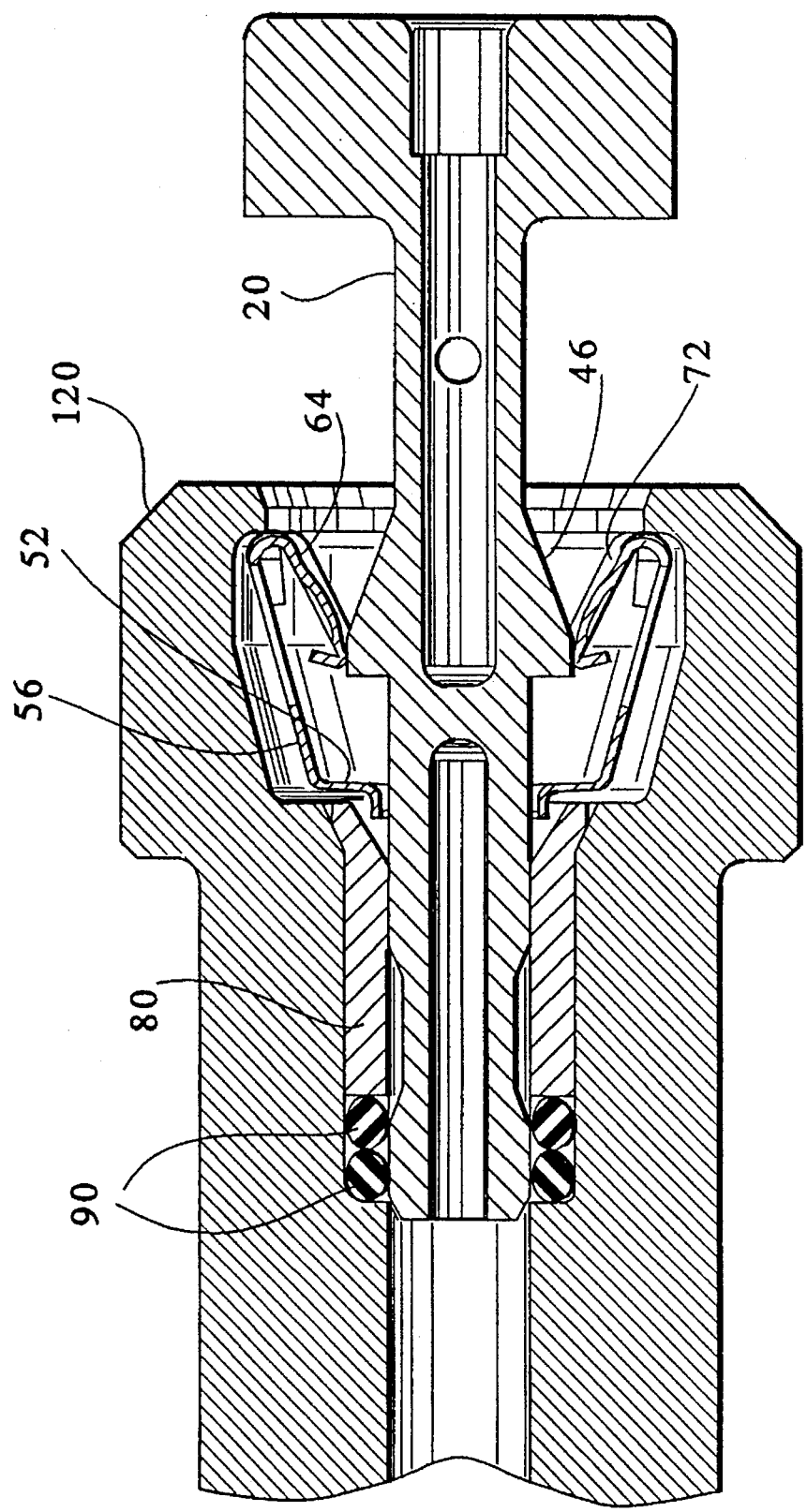
FIG. 4 is a sectional view illustrating partial removal of the component carrier from a loaded female connector body.

Carrier 20 is withdrawn from connector body 120 prior to insertion of the male member portion of the quick connector coupling. FIG. 4 illustrates carrier 20 in a partial state of withdrawal from a loaded connector body 120. Frustroconical wall 46 is the key to effective withdrawal of carrier 20. Contact of wall 46 against retaining members 64 and wings 72 of retainer legs 56 as carrier 20 is withdrawn gradually flexes these leg portions outwardly. This allows carrier 20 to be removed from connector body 120 without causing concomitant removal of, or mispositioning of, the retainer and sealing elements.

Figure 5:
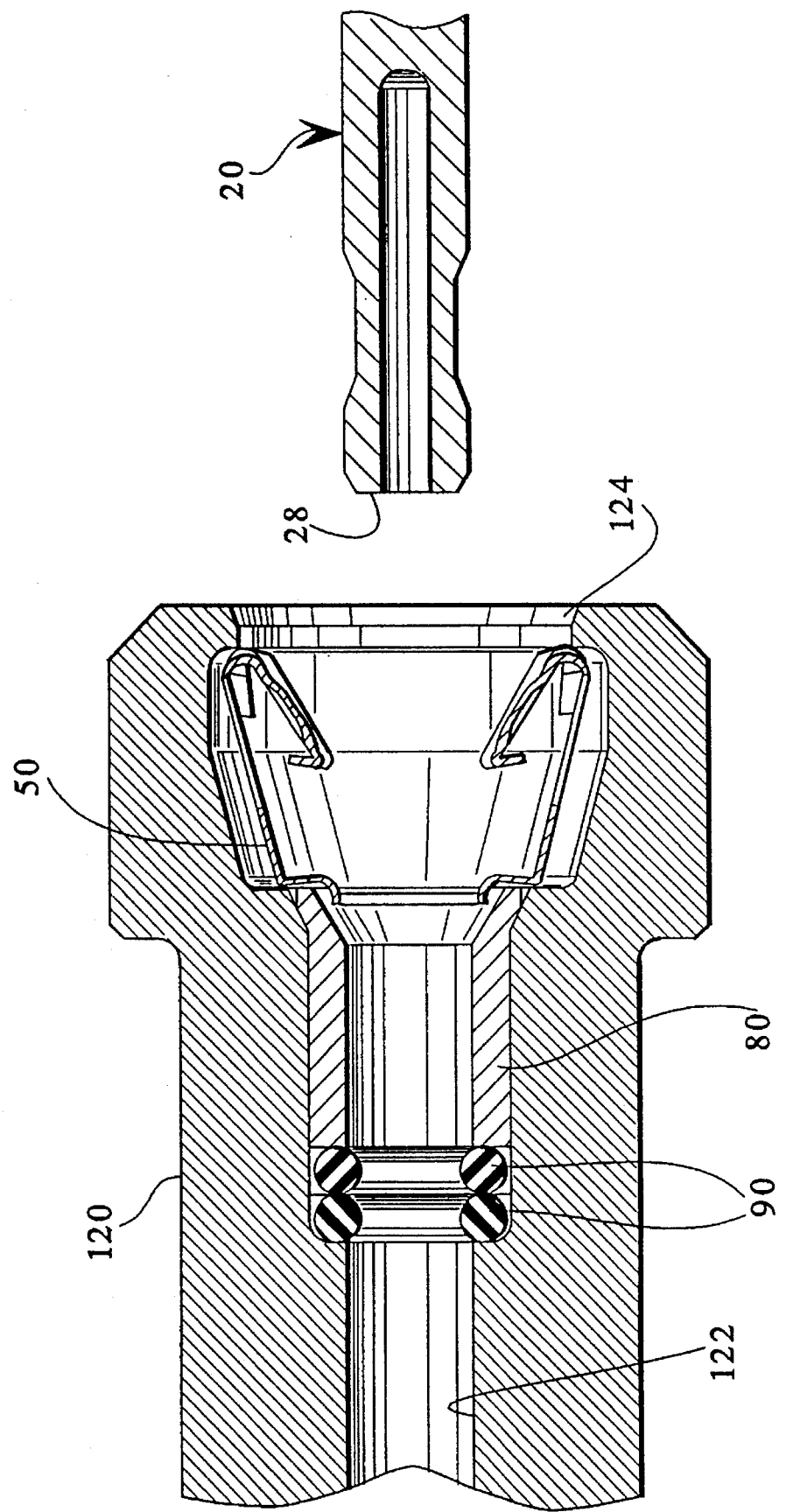
FIG. 5 is a sectional view illustrating complete removal of the component carrier from a loaded female connector body.

FIG. 5 shows a loaded connector body 120 after complete removal of component carrier 20. Retainer 50, spacer 80 and O-ring 90 remain disposed in their proper orientation within connector body 120. Connector body 120 is now properly outfitted for receipt of a male member.

FIG. 6 illustrates a quick connector coupling 110 formed between a male member 150 and a female connector body 120. 2Female connector body 120 has been loaded with retainer 50, spacer 80 and O-rings 90 as described with reference to FIGS. 2–5.

Male member 150 is formed at an end of a tube which forms a part of a fluid line system. It includes a first upset 152 formed a given distance from tube end 154. Cylindrical sealing wall 156 is continuous with and extends between first upset 152 and tube end 154. A second upset 158 is formed a greater distance from tube end 154. The distance between upset 152 and upset 158 must be less than the distance between retainer ring 52 and leg flanges 70. Upsets 152 and 158 may be formed by conventional upsetting techniques.

A hollow, annular ferrule 160 is disposed on male member 150 between upsets 152 and 158. Ferrule 160 extends between an end 161 adjacent upset 152 and an end 163 adjacent upset 158. Ferrule 160 fits tightly between upsets 152 and 158, so that it does not move axially relative to male member 150. To insure a snug fit, a first concavity 162 conforming to the exterior shape of first upset 152 is formed in the interior of ferrule 160 adjacent ferrule end 161, and a second concavity 164 conforming to the exterior shape of second upset 158 is formed in the interior of ferrule 160 adjacent ferrule end 163.

Ferrule 160 may be secured on male member 150 by first forming upset 158 on male member 150. Then, ferrule 160 can be slid over tube end 154 until interior concavity 164 receives upset 158. Next upset 152 is formed on male member 150 such that it is received in ferrule interior concavity 162.

Figure 10:
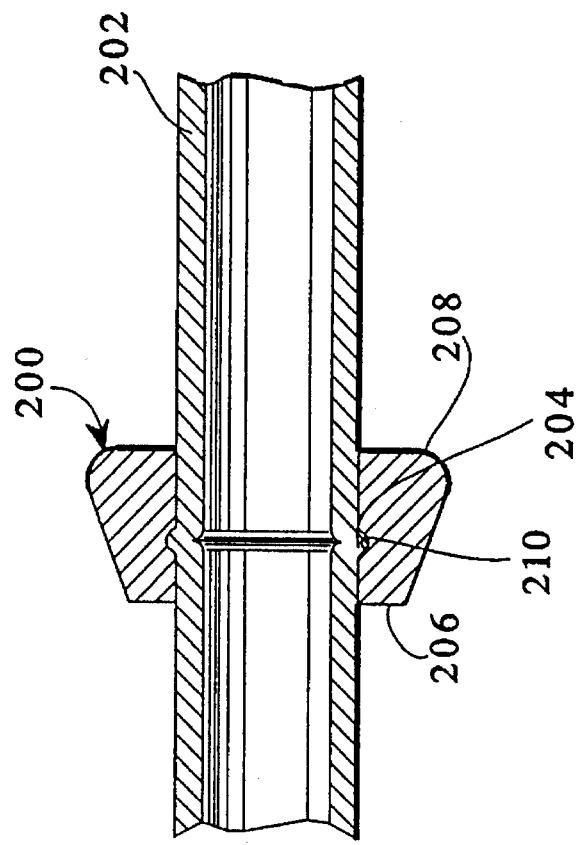
FIG. 10 is a partial sectional view of an alternate male member which also embodies the presnent invention.

An alternate method of securing a ferrule on a male member is illustrated in FIG. 10. A hollow, annular ferrule 200 is disposed on a male member 202 around one upset 204. Ferrule 200 extends between annular end 206 and annular end 208. A concavity 210 centrally located between ends 206 and 208 is formed in the interior of ferrule 200 and receives upset 204. Concavity 210 has a shape conforming to the external shape of upset 204, such that ferrule 200 fits tightly around upset 204 and is securely retained on male member 202.

Referring again to FIG. 6, quick connector coupling 110 is formed by inserting tube end 154 of male member 150 into entrance 124 of connector body bore 122. Since the outer diameter of ferrule 160 is greater than the radially inner dimension of portions of retaining members 64 of retainer 50, retaining members 64 and wings 72 resist insertion of male member 150. As ferrule 160 passes, retaining members 64 and wings 72 are flexed outwardly. Once ferrule 160 has fully passed, the retaining members and wings spring back into place behind ferrule 160. Ferrule 160 is retained on male member 150 between retaining ring 52 and leg flanges 70 and wing flanges 79. Since wings 72 extend from wing flanges 79 to wing bend 74, which abuts connector body shoulder 130, male member 150 is retained in connector body 120.

O-rings 90 are in sealing contact with sealing wall 156 formed on male member 150, and with sealing wall 142 formed in connector body 120, establishing a fluid seal between male member 150 and connector body 120.

Various features of the present invention have been explained with reference to the embodiment shown and described. Modification may be made without departing from the spirit and scope of the invention.

I claim:

1. A stuffer pin assembly for carrying and loading internal components of a female connector body of a quick connector coupling, said quick connector coupling including a male member sealingly received and secured within said female connector body, said stuffer pin assembly comprising:

a component carrier having a cylindrical body and a radially enlarged portion formed at a first end of said cylindrical body, said body extending from said enlarged portion to a second end remote from said enlarged portion, said body including a frustro-conical nose formed at said second end, a first cylindrical wall extending from said nose to a groove, a second cylindrical wall extending from said groove to a lowermost extent of a radial shoulder, a third cylindrical wall extending from an uppermost extent of said shoulder to a large diameter end of a frustro-conical wall, and a fourth cylindrical wall extending from a small diameter end of said frustro-conical wall to said enlarged portion;

at least one seal secured on said component carrier within said groove;

a hollow spacer secured on said component carrier between said groove and said radial shoulder and surrounding said second cylindrical wall; and a retainer for retaining said male member in said connector body secured on said component carrier, said retainer including an annular ring surrounding said second cylindrical wall between said spacer and said radial shoulder, said retainer further including a plurality of legs extending away from said ring and toward said first end of said component carrier for engaging said connector body and thereby retaining said male member in said connector body.

2. A stuffer pin assembly as recited in claim 1 wherein bores extend into said component carrier body from said first end and from said second end, a solid web being formed in a central portion of said body and separating said bores.

3. A stuffer pin assembly as recited in claim 2 wherein a pair of circumferentially spaced apertures are formed through said fourth cylindrical wall of said component carrier body.

4. A stuffer pin assembly as recited in claim 1 wherein said at least one seal consists of two O-rings.

5. A stuffer pin assembly as recited in claim 1 wherein a conical enlargement is formed at an end of said spacer remote from said at least one seal.

6. A stuffer pin assembly as recited in claim 5 wherein a cylindrical collar extends from said annular ring of said retainer into a space defined between said conical enlargement of said spacer and said second cylindrical surface of said component carrier body.

7. A stuffer pin assembly as recited in claim 1 wherein two circumferentially spaced tabs project axially away from said radially enlarged portion of said component carrier.

8. A stuffer pin assembly as recited in claim 1 wherein each said leg of said retainer includes a support member extending away from said annular ring to a first leg bend, a retaining member extending away from said first bend toward said annular ring, and wings extending circumferentially from lateral edges of said retaining member.

9. A stuffer pin assembly as recited in claim 8 wherein each of said wings extends between an outer wing bend remote from said annular ring and an inner wing bend adjacent, but spaced from, said annular ring, said outer wing bend being spaced further from said annular ring than said first leg bend.

10. A stuffer pin assembly as recited in claim 9 wherein said retaining member extends to a leg flange adjacent said inner wing bend.

11. A stuffer pin assembly for carrying and loading internal components of a female connector body of a quick connector coupling, said quick connector coupling including a male member sealingly received and secured within said female connector body, said stuffer pin assembly comprising:

a component carrier including a cylindrical body extending between a first end and a second end, said body including a radial shoulder spaced from said first end, a cylindrical wall extending between said radial shoulder and said second end, and a groove formed in said cylindrical wall spaced from said shoulder.

at least one seal secured on said component carrier within said groove;

a hollow spacer secured on said component carrier between said groove and said radial shoulder and surrounding said cylindrical wall, said spacer having a cylindrical body portion and a conically enlarged end remote from said at least one seal; and a retainer for retaining said male member in said connector body secured on said component carrier, said retainer including an annular ring surrounding said cylindrical wall between said conically enlarged end of said spacer and said radial shoulder, said retainer further including a plurality of legs extending away from said ring and toward said first end of said component carrier for engaging said connector body and thereby retaining said male member in said connector body.

12. A stuffer pin assembly as recited in claim 11 wherein apertures are formed through said cylindrical body between said radial shoulder and said first end.

* * * * *